US009069243B2

(12) United States Patent
Sgromo

(10) Patent No.: US 9,069,243 B2
(45) Date of Patent: Jun. 30, 2015

(54) SYSTEM AND METHOD FOR GENERATING A THREE-DIMENSIONAL IMAGE ON A PRE-PRINTED LINED SUBSTRATE

(75) Inventor: Peter Sgromo, Alameda, CA (US)

(73) Assignee: Imperial Toy, LLC, North Hills, CA (US)

( * ) Notice: Subject to any disclaimer, the term of this patent is extended or adjusted under 35 U.S.C. 154(b) by 497 days.

(21) Appl. No.: 12/730,134

(22) Filed: Mar. 23, 2010

(65) Prior Publication Data
US 2011/0025686 A1    Feb. 3, 2011

Related U.S. Application Data

(60) Provisional application No. 61/162,666, filed on Mar. 23, 2009, provisional application No. 61/249,104, filed on Oct. 6, 2009.

(51) Int. Cl.
G06T 19/00    (2011.01)
G03B 35/26    (2006.01)
A63H 33/22    (2006.01)
G09B 11/04    (2006.01)

(52) U.S. Cl.
CPC .............. *G03B 35/26* (2013.01); *A63H 33/22* (2013.01); *G09B 11/04* (2013.01)

(58) Field of Classification Search
CPC ........................... G06T 15/00; H04N 13/0429
USPC .................................. 345/419, 589; 382/154
See application file for complete search history.

(56) References Cited

U.S. PATENT DOCUMENTS

| 839,016 | A | | 12/1906 | MacDonald |
|---|---|---|---|---|
| 1,533,437 | A | | 4/1925 | Macy |
| 2,720,722 | A | | 10/1955 | Hiser |
| 3,711,183 | A | | 1/1973 | Braunhut |
| 3,747,232 | A | | 7/1973 | Donaldson et al. |
| 3,849,911 | A | | 11/1974 | Longenecker |
| 4,620,770 | A | * | 11/1986 | Wexler .......................... 359/464 |
| 4,705,371 | A | | 11/1987 | Beard |
| 4,726,653 | A | | 2/1988 | Thaler et al. |
| 4,744,633 | A | | 5/1988 | Sheiman |
| 4,976,620 | A | | 12/1990 | Tacquard et al. |
| 5,101,269 | A | | 3/1992 | Shelley et al. |

(Continued)

OTHER PUBLICATIONS

PCT International Search Report and Written Opinion on counterpart International Application No. PCT/US2010/028362 filed Mar. 23, 2010 by Applicant Imperial Toy LLC, dated Jun. 8, 2010.

(Continued)

*Primary Examiner* — Ke Xiao
*Assistant Examiner* — Weiming He
(74) *Attorney, Agent, or Firm* — Snell & Wilmer L.L.P.

(57) ABSTRACT

A system for producing and viewing a three-dimensional/stereoscopic image comprises a two-dimensional substrate having a number of blank regions that has been filled in/colored by a user with selected colors calculated to produce a stereoscopic image when viewed through a stereoscopic viewer. The colored regions are separated by black lines and together operate to form a desired image. The image has a background that is predominately black. The black lines and/or background can be provided before or after the user has colored in the blank regions. When the colored image comprising the black lines and black background is viewed through a stereoscopic viewer, the user perceives a three-dimensional image.

21 Claims, 2 Drawing Sheets

(56) References Cited

U.S. PATENT DOCUMENTS

| | | |
|---|---|---|
| 5,173,324 A | 12/1992 | Newhart |
| 5,304,064 A * | 4/1994 | Atkinson .................. 434/85 |
| 5,795,154 A | 8/1998 | Woods |
| 5,993,004 A | 11/1999 | Moseley et al. |
| 6,266,186 B1 | 7/2001 | Greiner |
| 7,056,121 B2 | 6/2006 | Koeppel |
| 7,156,017 B1 * | 1/2007 | Ingraselino .................. 101/129 |
| 2002/0063957 A1 | 5/2002 | Kakizawa |
| 2002/0118454 A1 | 8/2002 | Hey |
| 2005/0117215 A1 | 6/2005 | Lange |
| 2008/0018859 A1 | 1/2008 | Gauger |
| 2008/0174866 A1 | 7/2008 | Oliver |
| 2008/0278807 A1 | 11/2008 | Richards et al. |
| 2009/0231697 A1 | 9/2009 | Marcus et al. |

OTHER PUBLICATIONS

International Preliminary Report on Patentability of corresponding International Application No. PCT/US2010/028362 dated Jul. 25, 2011; total 14 pages.

* cited by examiner

SYSTEM AND METHOD FOR GENERATING A THREE-DIMENSIONAL IMAGE ON A PRE-PRINTED LINED SUBSTRATE

CROSS-REFERENCE TO RELATED APPLICATIONS

This patent application claims priority from U.S. Provisional Patent Applications 61/162,666 filed on Mar. 23, 2009, and 61/249,104 filed on Oct. 6, 2009, each of which are herein incorporated by reference in their entirety.

FIELD OF THE INVENTION

This invention relates to a system and method for generating a perceived three-dimensional image from a substrate having a pre-printed lined drawing which defines regions to be colored in by a user using a plurality of pigmented media. The perceived three-dimensional image results when a user views the colored substrate through a stereoscopic viewer. The system and method further includes instructions for generating a colored substrate which optimizes the resulting three-dimensional image perceived by the user.

BACKGROUND OF THE INVENTION

Traditional drawing and coloring activities are limited to two-dimensional results. Children either lay down colors through various mediums such as crayons, markers, colored pencils or paints within the black lines of a predominately white sheet of paper, i.e., black line art on paper, wherein the black lines may form an outline of a particular image and/or certain features within the image that is cast against or on a predominately white background. Alternatively, children can lay down different colors in a free-form manner, i.e., without the use of preformed black outlining, thereby creating their own free-form art renderings.

The art resulting from either of these known approaches is viewed by the human eye as two-dimensional, thus results in producing a two-dimensional image. While this type of art has been known and practiced for years, it provides minimal play value in viewing the created artwork. It is, therefore, desired that a product and method for using the same be developed to enable a user to color or otherwise participate in the creation of an art image having an enhanced image when viewed, thereby providing an enhanced level of play.

SUMMARY OF THE INVENTION

In one embodiment, a system for generating a three-dimensional image is provided. It is desired that such system provides a method for creating an image, e.g., art, that when viewed gives a three-dimensional illusion on an otherwise two-dimensional medium. Such system provides the added three-dimensional illusion of the image or art rendering only when viewed through stereographic glasses that are provided as part of the system. In an example embodiment, the illusion of the three-dimensional image or art on an otherwise two-dimensional medium through pre-set line drawings or free form art renderings. In this manner, the system operates to create an added play pattern to the traditional coloring and drawing process thereby increasing the play value.

In an example embodiment, the system comprises a substrate having a pre-printed lined drawing, preferably in black, defining regions to be colored in by a user. Alternatively, the substrate may lack some or all of the pre-lined features, and such features can be provided by the user in a free-form manner, e.g., through the use of black or darkly colored media. In a preferred embodiment, the substrate comprises a background that is predominantly black or otherwise provided in dark color, such as dark blue or the like. As noted below in greater detail, the use of an image having a predominately black background operates to enhance the three-dimensional viewing effect.

The system also comprises a plurality of pigmented media, such as markers, crayons, paint, wax, or the like adapted to apply color to the defined regions of the substrate. The media can be applied by hand, which can include any technique where a user directly or indirectly uses theirs hand(s) to apply the color, e.g., finger painting, drawing with a color delivery device or too, rubdown, or the like. Additionally, the media can be applied by brush, or by spray technique and the like. Preferably, the pigmented media comprises at least two colors which are either opposing or complementary on the color wheel spectrum. The system further comprises a stereoscopic viewer, which may be worn by the user to view the colored substrate and perceive the three-dimensional images resulting therefrom.

In another embodiment, a method for generating a three-dimensional image is provided. The method comprises obtaining a substrate having pre-printed lined indicia defining blank regions, applying at least two complementary colors using pigmented media to several of the blank regions, and viewing the resulting colored substrate through a stereoscopic viewer.

In a further embodiment, a virtual reality environment or game is provided. The virtual reality environment or game incorporates the colored substrate for generating a perceived three-dimensional environment that may be used as a scene backdrop. Additional props may be provided to further enhance the virtual or fantasy environment. The scene backdrops and props incorporating the colored substrate provide a three-dimensional environment or background in which a fantasy scene may be created or in which a multi-player game may be played.

A more complete understanding of system and methods disclosed herein will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

Throughout the several figures and in the specification that follows, like element numerals are used to indicate like elements appearing in one or more of the figures.

DETAILED DESCRIPTION OF THE PREFERRED EMBODIMENTS

Disclosed herein are systems and methods for generating a three-dimensional image, and for using the same in connection with creating a virtual and fantasy environment or game, from an otherwise two-dimensional substrate.

Figure 1:
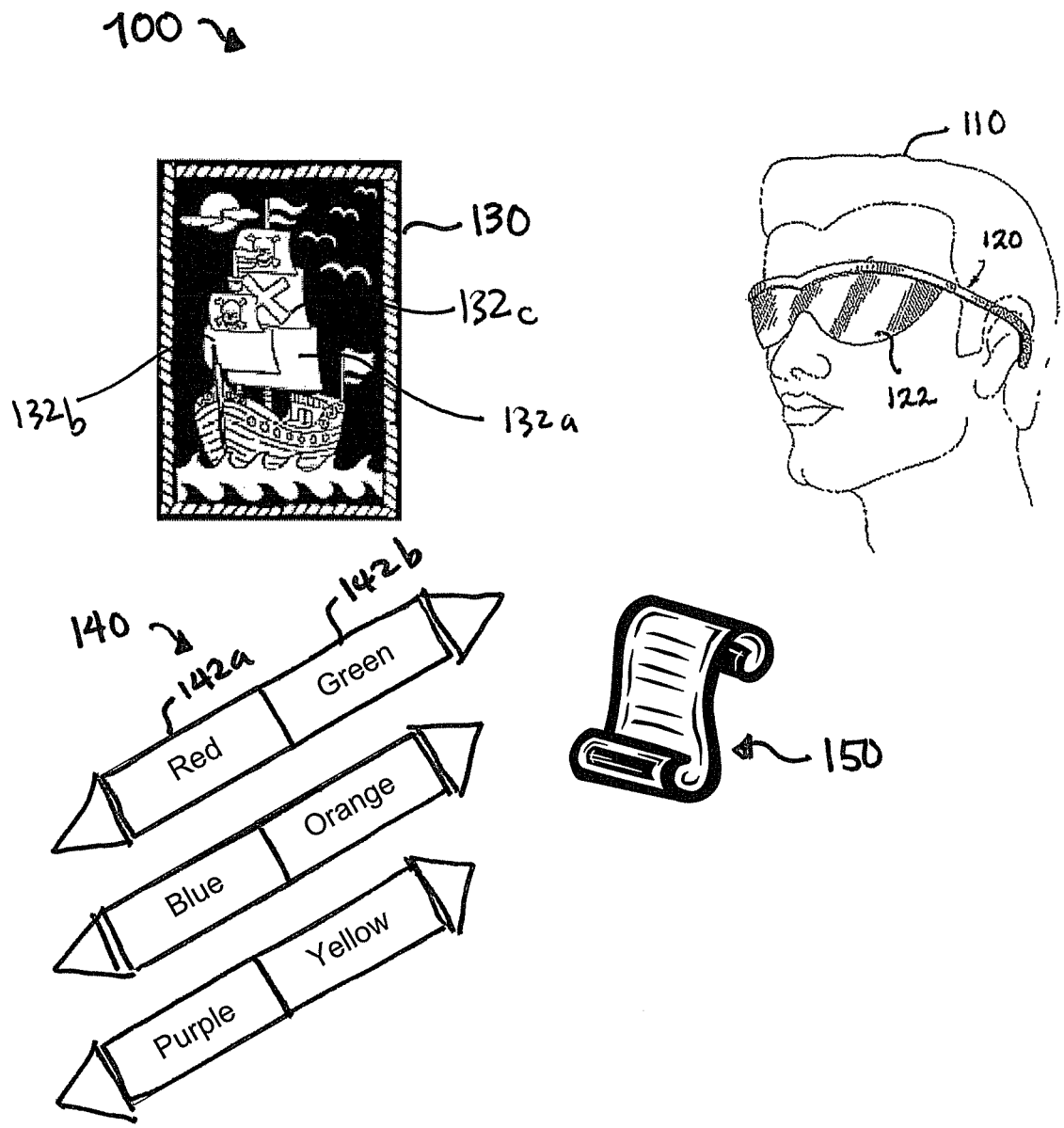
FIG. 1 depicts an exemplary embodiment of a system for generating a three-dimensional image.

FIG. 1 depicts an exemplary embodiment of a system 100 for generating a three-dimensional image. The system 100 comprises a substrate 130 comprising a pre-printed lined drawing defining blank regions 132*a*, *b* and *c*. The substrate 130 may be made of any material on which a color may be applied, such as paper, fabric and the like. In an example embodiment, the substrate presents an image that is presented against a black background.

In a preferred embodiment, it is desired that the background be predominately black for the purpose of providing an enhanced three-dimensional viewing experience, as the black operates to absorb light. In an example embodiment, it is desired that at least 25 percent of the image background be black, preferably greater than 50 percent of the image background be black, and more preferably greater that 75 percent of the image background be black. While the use of black has been disclosed as a desired color for the background, it is to be understood that other dark colors (such as dark blue and the like) can be used if effective to absorb light to enhance the three-dimensional viewing effect.

Alternately, the substrate that is used may not include a preprovided black background. In such case the user may, or can be directed to, apply the black background to the image as part of the play task of creating the desired image.

The substrate comprises the blank regions 132a, b and c, provided within black line borders, and which may include indicia indicating a suggested color to be applied. A plurality of pigmented media 140 is also provided to enable the user to apply at least two colors to the substrate 130. Preferably, the plurality of pigmented media 140 includes at least two colors 142a, 142b, which are considered to be opposed on the color wheel spectrum. Optionally, for ease of use, complementary colors may be provided on as a double-ended pen, marker or crayon, as depicted in FIG. 1.

In an example embodiment, the pigmented media is provided in the form of a color delivery system that can be applied by hand, which can include the user physically using their hand to apply the pigmented or color media, or the user using their hand to rub down through an intermediary medium, or by using brush, spray or other traditional technique. The pigmented media may comprise colors selected from the primary colors of red, blue, orange, and green. In an example embodiment, the blank regions of the substrate can be colored by applying opposite colors of the color spectrum, e.g., starting with red and cyan followed by orange and blue and then yellow and green. The pigmented media may provide the colors in a manner such that the colors are opaque. The use of opaque coloring medium is useful to ensure that the black borders of the image remain visible if colored over.

If desired, the system can include a black, or otherwise darkly colored, pigmented media useful for outlining colored regions of the image. This outlining can include coloring over existing preprovided black lines, e.g., that may have been colored over, and/or providing black lines for the first time and separating differently colored regions that have been applied free form. Additionally, the black colored pigmented media can be used to provide the background of the image it the case where the black background is not already provided. In all cases, the presence and/or use of the black pigmented media operates to enhance the three-dimensional viewing effect. Dark colors other than black that are useful in this regard include those capable of absorbing light to enhance the three-dimensional viewing effect.

A stereoscopic viewer 120 adapted to be worn by a user 110 is also provided. As shown in FIG. 1, the stereoscopic viewer 120 is a pair of eyeglasses having specially designed stereoscopic lenses 122. Stereoscopic viewers known in the art, are suitable for use in connection with the system. Example stereoscopic viewers include ones having red-blue lenses. Preferred stereoscopic viewer include those referred to by the product name Chromadepth and available from Chromatek, and that are disclosed in U.S. Pat. Nos. 4,597,634; 4,717,239; and 5,002,364, which are each incorporated herein by reference in their entirety.

Instructions 150 may be provided along with the system 100. The instructions 150 may be separately provided, as depicted in FIG. 1 as part of or separate from the product packaging, or can be provided as part of the substrate. The instructions 150 may contain suggestions as to the manner and location in which the colors may be applied to the substrate 130 so as to optimize the three-dimensional effect that is created when the user 110 views the colored substrate 130 via the stereoscopic glasses 120.

Figure 2:
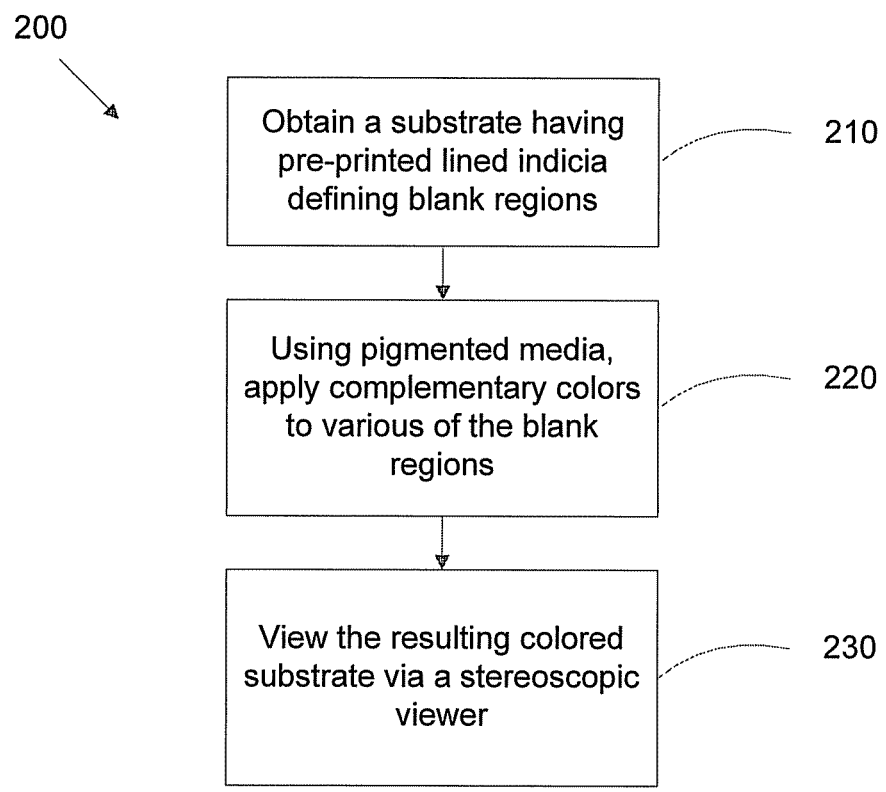
FIG. 2 is a flow chart showing exemplary steps in a method for generating a three-dimensional image.

FIG. 2 is a flow chart showing exemplary steps in a method 200 for generating a three-dimensional image. In step 210, the user obtains a substrate having a pre-printed lined indicia defining blank regions. Next, in step 220, the user applies complementary colors to various of the blank regions of the substrate using an appropriate pigmented media. Once the colors are applied to the substrate, in step 230, the user may view the resulting colored substrate via a stereoscopic viewer.

As noted above, the process of creating the three-dimensional image may involve the use of a substrate not already having the black-lined image and/or black image background, in which case the user would apply the black colored lining and/or background, and the colored features, as part of a free-form coloring task to produce the desired three-dimensional image when viewed through the stereoscopic viewing device.

While the preferred embodiments are disclosed herein as including pre-printed lined drawings, it is understood that the preferred embodiments are not so limited. Other preferred embodiments may include, in place of or in addition to the pre-printed lined drawings, implements and devices which enable a user to create lined drawings suitable for use in connection with the invention. Such implements and devices may include, for example, a spirograph system or a tracing system, in which the user may create lined drawings on blank sheets of paper. The same is true for creating the desired black background.

The systems and methods disclosed herein may be used to create a virtual reality or fantasy environment that may be incorporated as part of a game. In accordance with this embodiment, the substrate is preferably of a sufficiently large size to provide a sufficient background that can be oriented in any manner desired to provide a play environment. In one embodiment, the substrate may be of a size large enough to substantially cover a 8×10 feet area on a wall. Additional props may be provided to further enhance the virtual or fantasy environment. The scene backdrops and props incorporating the colored substrate provide a three-dimensional environment or background in which a fantasy scene may be created, or in which a multi-player game can be played. Each of the players is preferably provided with a stereoscopic viewer to share in the virtual realty or fantasy scene that is created by the colored substrate.

Having thus described preferred embodiments for a system for generating a three-dimensional image, it should be apparent to those skilled in the art that certain advantages of the within methods and systems have been achieved. It should also be appreciated that various modifications, adaptations, and alternative embodiments thereof may be made without departing from the scope and spirit of the present technology.

What is claimed is:

1. A system for producing and viewing a three-dimensional image from a two-dimensional substrate, the system comprising:

a two-dimensional substrate comprising a single preprinted image having a number of initially blank regions and preprinted black lines adjacent at least one of the initially blank regions, wherein the preprinted black lines are provided in a manner calculated to produce a 3-dimensional image from the initially blank regions when colored, wherein the colors are selected from the group consisting of opposing or complementary colors of the color wheel spectrum and the initially blank regions comprise an indicator of which color to use to fill in the same, wherein the initially blank regions are filled in by a user with one of two different indicated colors forming a first colored region comprising a first color and a second colored region comprising a second color, wherein the colored regions are separated by the preprinted black lines, and wherein the preprinted image has a predominately dark background; and a stereoscopic viewer for viewing the image on the substrate comprising the first and second colored regions and perceiving a three-dimensional image from the combination of the colored regions, the preprinted black lines, and the predominately dark background of the two-dimensional substrate.

2. The system as recited in claim 1 wherein the background is black.

3. The system as recited in claim 1 wherein the image is presented against a background that is at least 75 percent black.

4. The system as recited in claim 1 wherein the colors are selected from the group consisting of primary colors.

5. The system as recited in claim 1 wherein the two or more colors indicated are opposing or complementary with respect to the primary color spectrum.

6. The system as recited in claim 1 wherein the substrate is selected from the group consisting of solid and flexible objects.

7. The system as recited in claim 6 wherein the substrate is selected from the groups consisting of paper, wood, metal, plastic, concrete, asphalt, fabric, leather and combinations thereof.

8. The system as recited in claim 1 wherein the blank regions are white before being filled in by a user.

9. The system as recited in claim 1 wherein the stereoscopic viewer comprises a pair of glasses having a red lens and a blue lens.

10. A method for producing a three-dimensional image from a two-dimensional substrate comprising the steps of:

taking a substrate having a preprinted image and filling in two or more initially blank regions separated by black lines with two or more different colors to form two or more differently-colored regions, wherein the colors are selected from the group consisting of opposing or complementary colors of the color wheel spectrum and an indication of the colors to use are provided in the blank regions, wherein the two or more differently-colored regions are part of the preprinted image and wherein the black lines are preprinted onto the substrate, separate the differently colored regions, and are positioned in a manner to produce a three-dimensional image from the differently colored regions, and wherein the image is presented against a background that is at least partially black; and viewing the substrate having the two or more differently-colored regions with a stereoscopic viewer to perceive a three-dimensional image promoted by the differently-colored regions.

11. The method as recited in claim 10 wherein the black background is provided by a user before the step of viewing.

12. The method as recited in claim 10 wherein at least 25 percent of the image background is black.

13. The method as recited in claim 10 wherein at least 50 percent of the image background is black.

14. The method as recited in claim 10 wherein at least 75 percent of the image background is black.

15. The method as recited in claim 10 wherein the image background is predominately black.

16. The method as recited in claim 10 wherein at least 25 percent of the total surface area of the substrate is black.

17. The method as recited in claim 10 wherein the stereoscopic viewer comprises a pair of glasses comprising one red and one blue lens.

18. A method for creating a stereoscopic image comprising the steps of:

forming a number of differently colored regions on a substrate by applying selected colors onto respective selected regions of a single preprinted image, wherein the selected regions are initially blank and include an indicator of which color to use, wherein the colors that are used are selected from the group consisting of opposing or complementary colors of the color wheel spectrum to provide a stereoscopic image when viewed through a stereoscopic viewer, wherein one or more of the differently colored regions are separated by one or more black lines, wherein the black lines are preprinted on the substrate and are positioned in a manner so as to produce a three-dimensional image from the colored regions, and wherein the background to the image is black; and viewing the image through a stereoscopic viewer to produce to the user a perceived stereoscopic image.

19. The method as recited in claim 18 wherein the image black background is provided before the step of forming.

20. The method as recited in claim 18 wherein the image black background is provided after formation of the differently colored regions.

21. The method as recited in claim 18 wherein at least about 25 percent of the total surface area of the substrate is black.

* * * * *